(12) United States Patent
Surace et al.

(10) Patent No.: US 8,137,068 B2
(45) Date of Patent: Mar. 20, 2012

(54) CASTINGS, CASTING CORES, AND METHODS

(75) Inventors: Raymond Surace, Newington, CT (US); Justin D. Piggush, Hartford, CT (US); Tracy A. Propheter-Hinckley, Manchester, CT (US); Amarnath Ramlogan, Glastonbury, CT (US); Yongxiang D. Xue, Glastonbury, CT (US); Anthony P. Cherolis, East Hartford, CT (US); Matthew A. Devore, Manchester, CT (US); Eric P. Letizia, East Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 664 days.

(21) Appl. No.: 12/275,793

(22) Filed: Nov. 21, 2008

(65) Prior Publication Data

US 2010/0129195 A1    May 27, 2010

(51) Int. Cl.
*F01D 5/18*    (2006.01)
(52) U.S. Cl. ........................................ 416/97 R; 164/44
(58) Field of Classification Search ................ 416/97 R, 416/97 A; 164/44, 235
See application file for complete search history.

(56) References Cited

U.S. PATENT DOCUMENTS

| | | | |
|---|---|---|---|
| 5,700,131 A | 12/1997 | Hall et al. | |
| 5,720,431 A | 2/1998 | Sellers et al. | |
| 5,931,638 A | 8/1999 | Krause et al. | |
| 6,637,500 B2 | 10/2003 | Shah et al. | |
| 6,929,054 B2 | 8/2005 | Beals et al. | |
| 7,014,424 B2 | 3/2006 | Cunha et al. | |
| 7,134,475 B2 | 11/2006 | Snyder et al. | |
| 7,270,515 B2 * | 9/2007 | Liang | 416/97 R |
| 7,303,375 B2 * | 12/2007 | Cunha et al. | 416/90 R |
| 2006/0239819 A1 | 10/2006 | Albert et al. | |
| 2009/0238695 A1 * | 9/2009 | Devore et al. | 416/97 R |

FOREIGN PATENT DOCUMENTS

| | | |
|---|---|---|
| EP | 1939400 A2 | 7/2008 |
| EP | 2103781 A2 | 9/2009 |

OTHER PUBLICATIONS

EP Search Report for 09252633.4, dated Mar. 15, 2010.

* cited by examiner

*Primary Examiner* — Chandra Chaudhari
(74) *Attorney, Agent, or Firm* — Bachman & LaPointe, P.C.

(57) ABSTRACT

The pattern has a pattern material and a casting core combination. The pattern material has an airfoil. The casting core combination is at least partially embedded in the pattern material. The casting core combination comprises a plurality of metallic casting cores. Each metallic casting core has opposite first and second faces and a respective portion along the trailing edge of the airfoil. At least two of the metallic cores have sections offset between the pressure side and the suction side.

23 Claims, 13 Drawing Sheets

CASTINGS, CASTING CORES, AND METHODS

BACKGROUND

The disclosure relates to investment casting. More particularly, it relates to the investment casting of superalloy turbine engine components.

Investment casting is a commonly used technique for forming metallic components having complex geometries, especially hollow components, and is used in the fabrication of superalloy gas turbine engine components. The disclosure is described in respect to the production of particular superalloy castings, however it is understood that the disclosure is not so limited.

Gas turbine engines are widely used in aircraft propulsion, electric power generation, and ship propulsion. In gas turbine engine applications, efficiency is a prime objective. Improved gas turbine engine efficiency can be obtained by operating at higher temperatures, however current operating temperatures in the turbine section exceed the melting points of the superalloy materials used in turbine components. Consequently, it is a general practice to provide air cooling. Cooling is provided by flowing relatively cool air from the compressor section of the engine through passages in the turbine components to be cooled. Such cooling comes with an associated cost in engine efficiency. Consequently, there is a strong desire to provide enhanced specific cooling, maximizing the amount of cooling benefit obtained from a given amount of cooling air. This may be obtained by the use of fine, precisely located, cooling passageway sections.

The cooling passageway sections may be cast over casting cores. Ceramic casting cores may be formed by molding a mixture of ceramic powder and binder material by injecting the mixture into hardened steel dies. After removal from the dies, the green cores are thermally post-processed to remove the binder and fired to sinter the ceramic powder together. The trend toward finer cooling features has taxed core manufacturing techniques. The fine features may be difficult to manufacture and/or, once manufactured, may prove fragile. Commonly-assigned U.S. Pat. Nos. 6,637,500 of Shah et al., 6,929,054 of Beals et al., 7,014,424 of Cunha et al., 7,134,475 of Snyder et al., and U.S. Patent Publication No. 20060239819 of Albert et al. (the disclosures of which are incorporated by reference herein as if set forth at length) disclose use of ceramic and refractory metal core combinations.

SUMMARY

One aspect of the disclosure involves a pattern for casting a component having an airfoil. The pattern comprises a pattern material and a casting core combination. The pattern material has an airfoil. The casting core combination is at least partially embedded in the pattern material. The casting core combination comprises a plurality of metallic casting cores. Each metallic casting core has opposite first and second faces and a respective portion along the trailing edge of the airfoil. At least two of the metallic cores extend partially outside the airfoil within the pattern material and have sections offset between the pressure side and the suction side.

In various implementations, the respective portions of at least three of the metallic casting cores may be spanwise offset relative to each other. The casting core combination may comprise at least one additional casting core which may comprise at least one ceramic casting core. A portion of a first said metallic casting core may be to the suction side of a portion of the at least one ceramic casting core. A portion of a second said metallic casting core may be to the pressure side of the at least one ceramic casting core. The at least one ceramic casting core may comprise at least one ceramic feedcore. A trunk of the ceramic feedcore may be adjacent to at least one of the metallic casting cores.

The component may be a vane. The pattern material may have an OD shroud portion. The at least two of the metallic casting cores may protrude from the pattern material along the OD shroud portion. The component may be a blade wherein the pattern material has a fir-tree root portion and the adjacent portion extends at least partially within the root portion of the pattern material.

Other aspects of the disclosure involve methods for forming the pattern and/or methods for casting using the pattern.

Other aspects of the disclosure involve gas turbine engine components which may be cast from a shell formed from the pattern.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
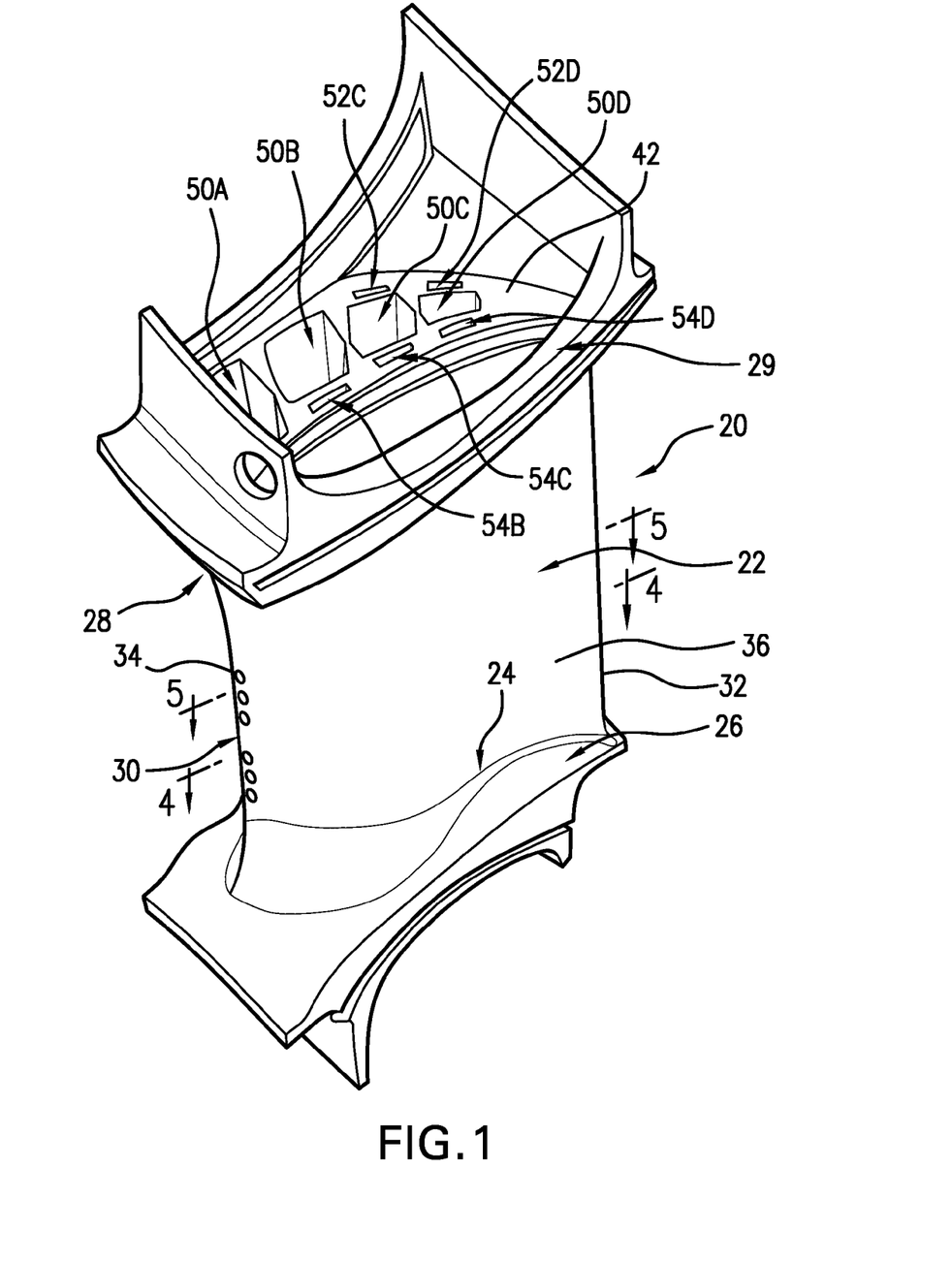
FIG. 1 is a view of a cast vane.

FIG. 1 shows a gas turbine engine vane 20. The vane 20 has an airfoil 22 extending from an inboard end 24 at the outboard surface of a platform (or inner diameter (ID) shroud) 26 to an outboard end 28 at the inboard surface of an outboard (outer diameter or OD) shroud 29. The airfoil has a leading edge 30 and a trailing edge 32. The airfoil has a suction side/surface 34 and a pressure side/surface 36 extending between the leading edge 30 and the trailing edge 32.

Figure 2:
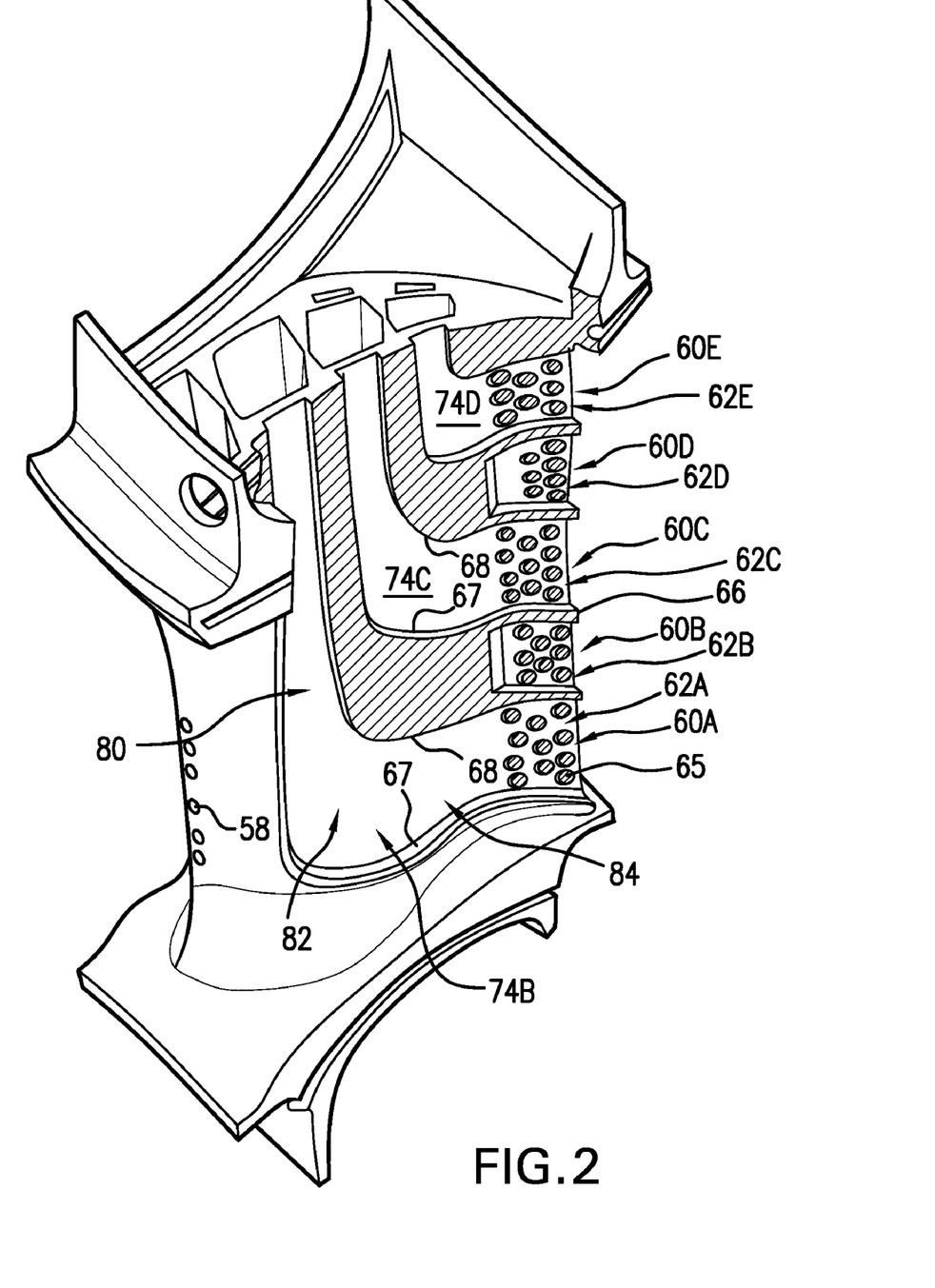
FIG. 2 is a cutaway view of the vane of FIG. 1.
Figure 3:
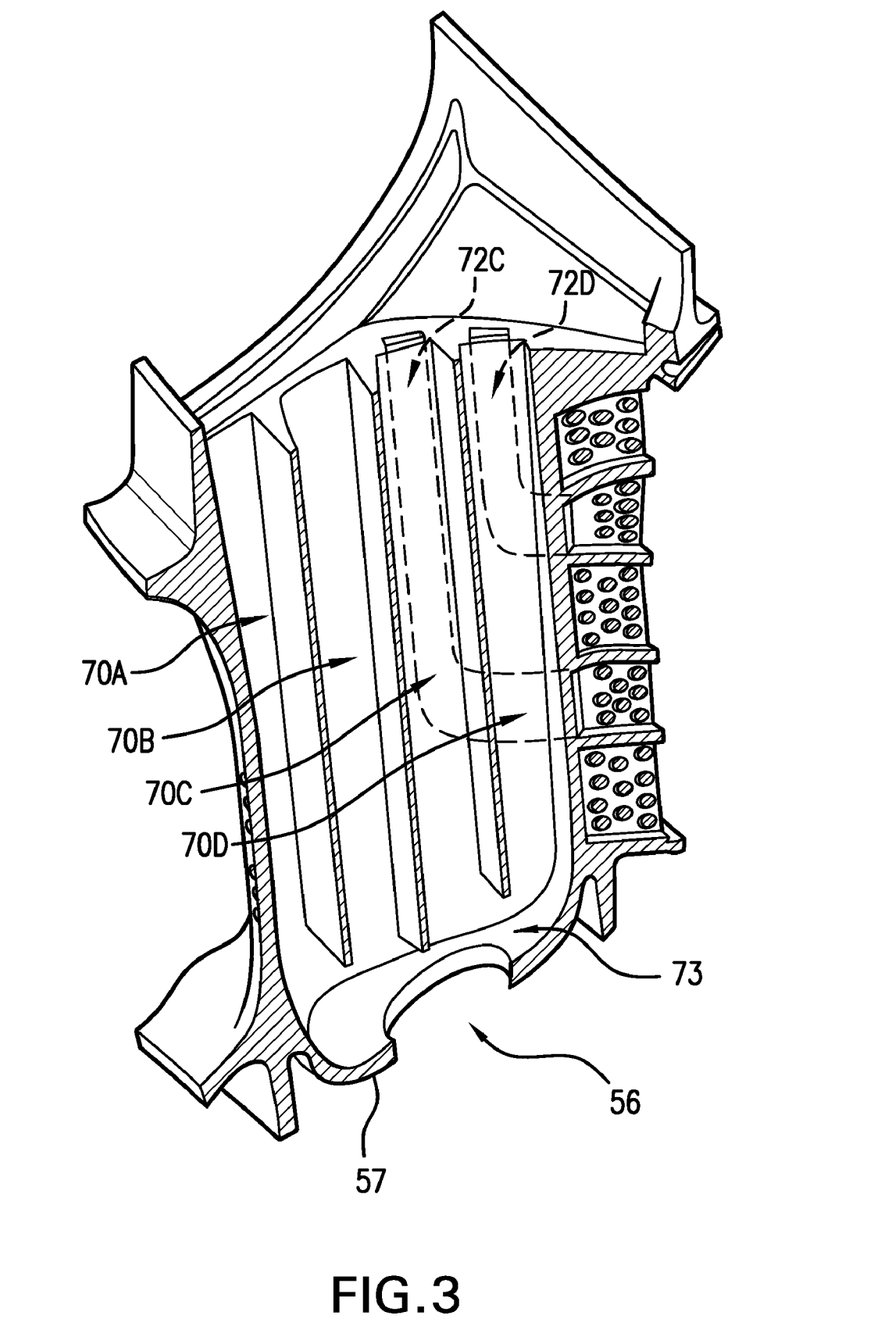
FIG. 3 is a second cutaway view of the vane of FIG. 1.
Figure 4:
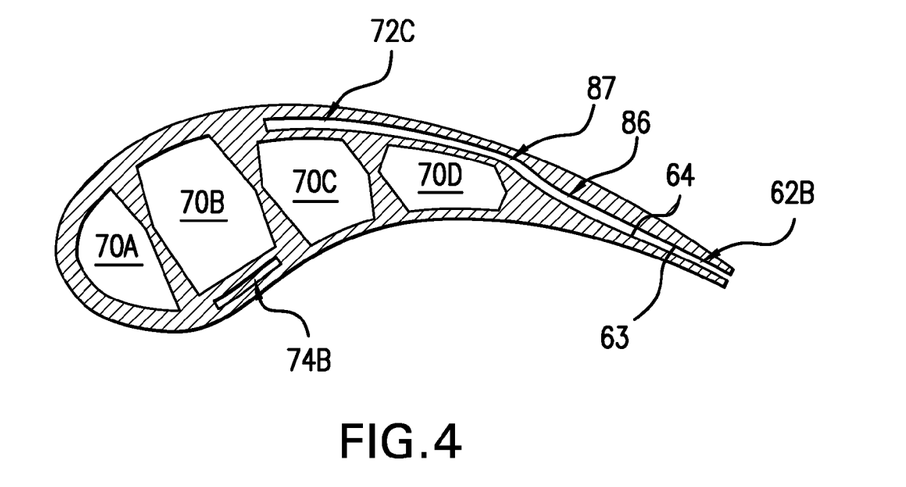
FIG. 4 is a sectional view of an airfoil of the vane of FIG. 1, taken along line 4-4.
Figure 5:
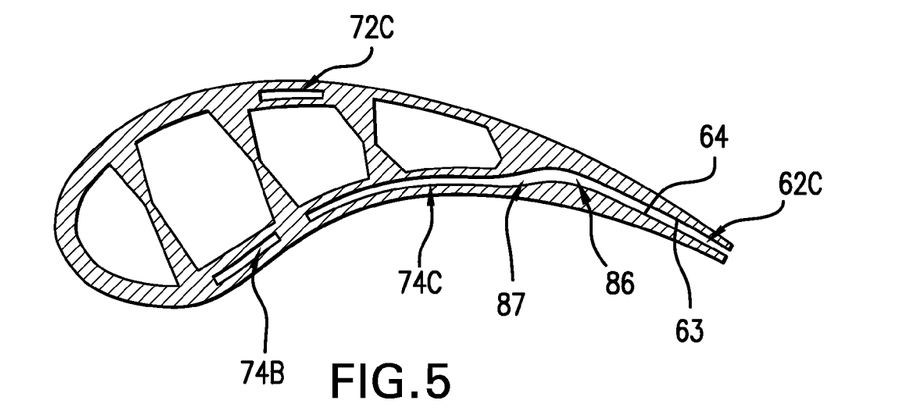
FIG. 5 is a sectional view of the airfoil of the vane of FIG. 1, taken along line 5-5.

The exemplary vane 20 is cast from an alloy (e.g., a nickel-based superalloy) and has an internal cooling passageway system. The exemplary cooling passageway system has a plurality of inlets. The exemplary inlets are along the OD shroud 29, more particularly along the outboard end/surface 42 of the OD shroud 29. The exemplary vane has inlets 50A-50D, 52C&52D, and 54B-54D (FIG. 1), discussed further below. The exemplary cooling passageway system has a plurality of outlets. The exemplary outlets include an outlet 56 (FIG. 3) along the ID surface 57 of the ID shroud 26 and outlets along the airfoil 22. Exemplary outlets along the airfoil include leading edge outlets 58 and trailing edge outlets 60A-60E (FIG. 2). The exemplary trailing edge outlets 60 are formed by respective segments 62A-62E of a trailing edge discharge slot. Each slot segment 62A-62E has a suction side surface 63 and a pressure side surface 64 (FIGS. 4&5). A plurality of posts 65 (FIG. 2) may extend between the surfaces 63 and 64. Additionally or alternatively, pedestals (not shown) may extend from either of the surfaces 63 or 64, terminating short of the other. Wall sections 66 (FIG. 2) may separate the respective segments 62A-62E from each other at edges 67 and 68. As is discussed below, the surfaces 63 and 64 and edges 67 and 68 continue upstream along passageways feeding the associated slot segments.

Some or all of the segments 62A-62E may be differently fed relative to each other (e.g., fed from different inlets or via at least partially separated passageways passing through different portions of the airfoil). In the exemplary embodiment, several differences exist in the feeding of the respective segments 62A-62E. The exemplary segments 62A, 62C, and 62E are fed via passageways passing mostly relatively near the pressure side 36 of the airfoil; whereas the segments 62B and 62D are fed by passageways passing relatively closer to the suction side 34.

The exemplary inlets 50A-50D, 52C&52D, and 54B-54D of FIG. 1 each feed a respective passageway 70A-70D (FIG. 3), 72C&72D, and 74B-74D (FIG. 2). The segments 62A, 62C, and 62E are respectively formed as terminal portions of the passageways 74B, 74C, and 74D, respectively, with 60A, 60C, and 60E being the outlets of such passageways. Similarly, the segments 62B and 62D are respectively formed as terminal portions of the passageways 72C and 72D, respectively, with 60B and 60D being the outlets thereof. The exemplary passageways 70A-70D merge in an outlet plenum 73 (FIG. 3) in the ID shroud 26 along which the outlet 56 is located.

Each of the exemplary passageways 72C and 72D and 74B-74D is approximately L-shaped in planform, having an upstream leg 80 extending spanwise inboard from the associated inlet to a junction 82 with a foot 84. The foot 84 extends streamwise to the associated outlet and includes the associated slot segment. The exemplary passageways 70A-70D are sequentially staggered streamwise relative to each other from upstream to downstream (leading edge toward trailing edge). These passageways 70A-70D are generally centrally positioned between the suction side 34 and pressure side 36. The passageways 72C and 72D are shifted relatively toward the suction side 34 (well away from the median of the airfoil section) at least along their legs 80 and upstream portions of their feet 84. Similarly, the passageways 74B-74D are shifted toward the pressure side 36 along their legs 80 and the upstream portions of their feet 84. Upstream of the segments 62A-62E, therefore, the groups of the passageways are staggered/offset from each other between the suction side 34 and pressure side 36. This stagger may be overall and may be local. An example of the local stagger is: at the OD shroud 29, the passageway 72C is immediately to the suction side of the passageway 70C and the passageway 74C is immediately to the pressure side of the passageway 70C. To accommodate this offset/stagger, the exemplary passageways 72C&72D and 74B-74D have bends (FIGS. 4 and 5) 86, 87 along the legs 84 upstream of the segments 62A-62E.

Figure 6:
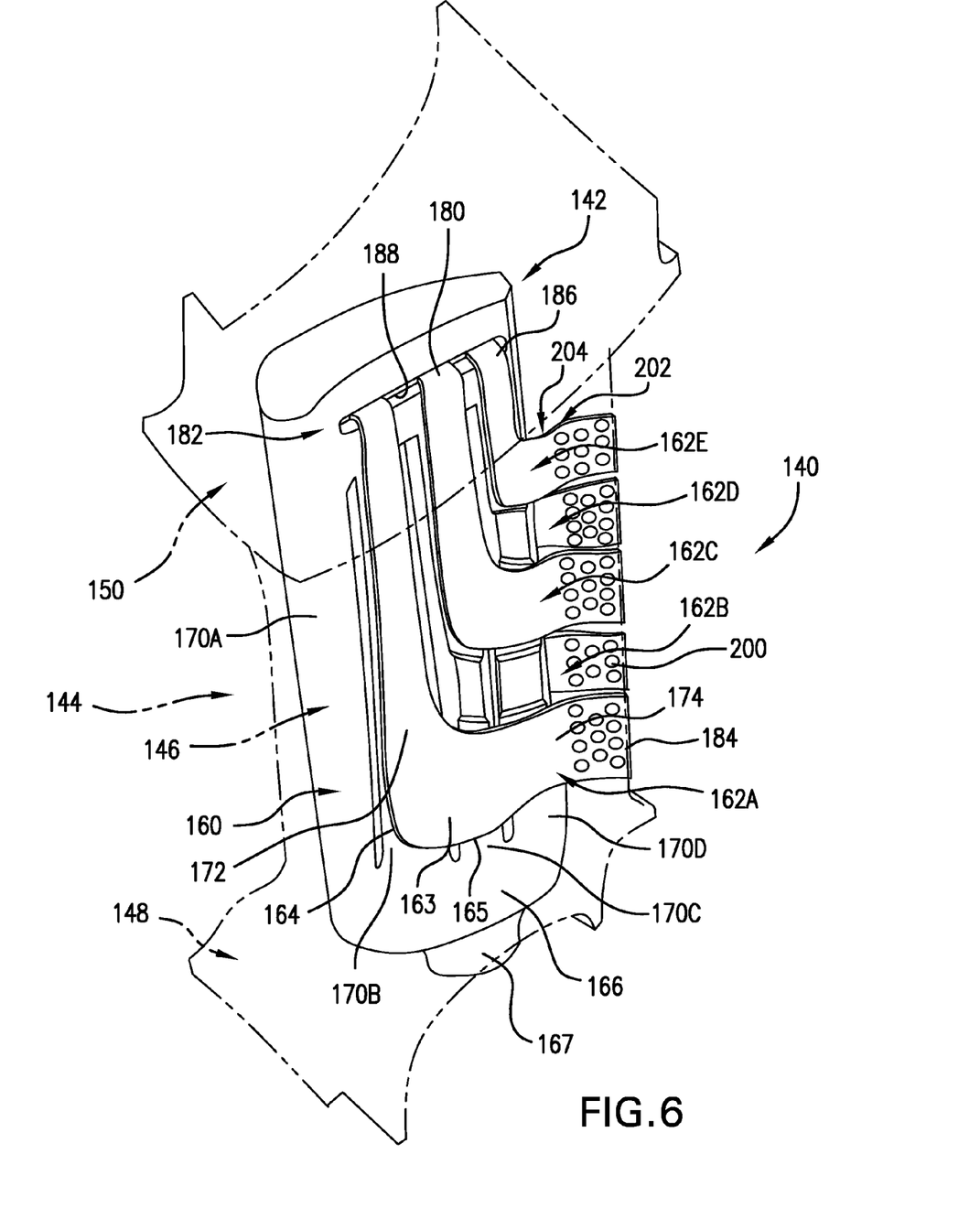
FIG. 6 is a view of a pattern for forming the vane of FIG. 1.

FIG. 6 shows a pattern 140 for casting the vane 20. The exemplary pattern comprises a combination 142 of casting cores (core combination) and a pattern material 144 (e.g., wax) in which the core combination is at least partially embedded. The pattern material has an external surface generally corresponding to the external surface of the vane 20 (i.e., having an airfoil 146, an ID shroud 148, and an OD shroud 150). The core combination 142 has an external surface (complementary to the mating internal surface of the pattern material) generally corresponding to portions of the passageway system (e.g., excluding drilled outlets). For purposes of illustration, FIG. 6 shows the combination 142 in solid lines and the pattern material 144 in broken lines.

The exemplary core combination 142 is formed as the assembly of one or more ceramic cores 160 and one or more metallic cores 162A-162E. In the exemplary core combination 142, the metallic casting cores 162A-162E are refractory metal cores (RMCs). Exemplary RMCs are refractory metal based (i.e., having substrates of at least fifty weight percent one or more refractory metals such as molybdenum, tungsten, niobium, or the like, optionally coated). Exemplary RMCs are formed of sheet stock and have opposite surfaces/faces 163 and 164 and an edge/perimeter 165.

In the exemplary pattern 140, the core combination 142 has surfaces overall complementary to at least main surfaces of the passageway network. Specifically, the exemplary ceramic core 160 includes respective trunk portions 170A-170D for casting the passageways, 70A-70D. The ceramic core 160 further includes an ID junction 166 for casting the plenum 73 and an ID neck 167 for casting the port 56.

The RMCs 162A-162E are positioned to cast the passageways respectively associated with the segments 62A-62E. The exemplary RMCs thus each include a corresponding leg portion 172 and foot portion 174. The RMCs further include first end portions 180 for mating with an OD portion 182 of the ceramic core 160. The exemplary RMC foot portions include terminal portions 184 protruding from the pattern material to embed in a shell (not shown) discussed below. The exemplary first end portions 180 are bent (e.g., at bends 186) away from adjacent portions of the legs 172 and captured in associated slots 188 in the OD portion 182. The exemplary joint/junction between the RMCs and the ceramic core (at the slot(s) 188 in the OD portion 182) is outside the overmolded pattern material and thus outside the final cast part. In addition to providing distinct/separate inlets, locating the junction outside the cast part also reduces formation of crystalline irregularities (e.g., separate crystalline regions formed at the junction when attempting to cast a single-crystal casting).

The RMCs may include features corresponding to the various features of the associated passageways. This may include apertures 200 for forming associated posts 65, recesses (not shown) for forming associated pedestals (not shown), and bends 202 and 204 for forming the bends 86 and 87. The RMC faces end up casting the passageway surfaces 63 and 64 and associated portions of the RMC edge/perimeter 165 end up casting the passageway edges 67 and 68.

Figure 7:
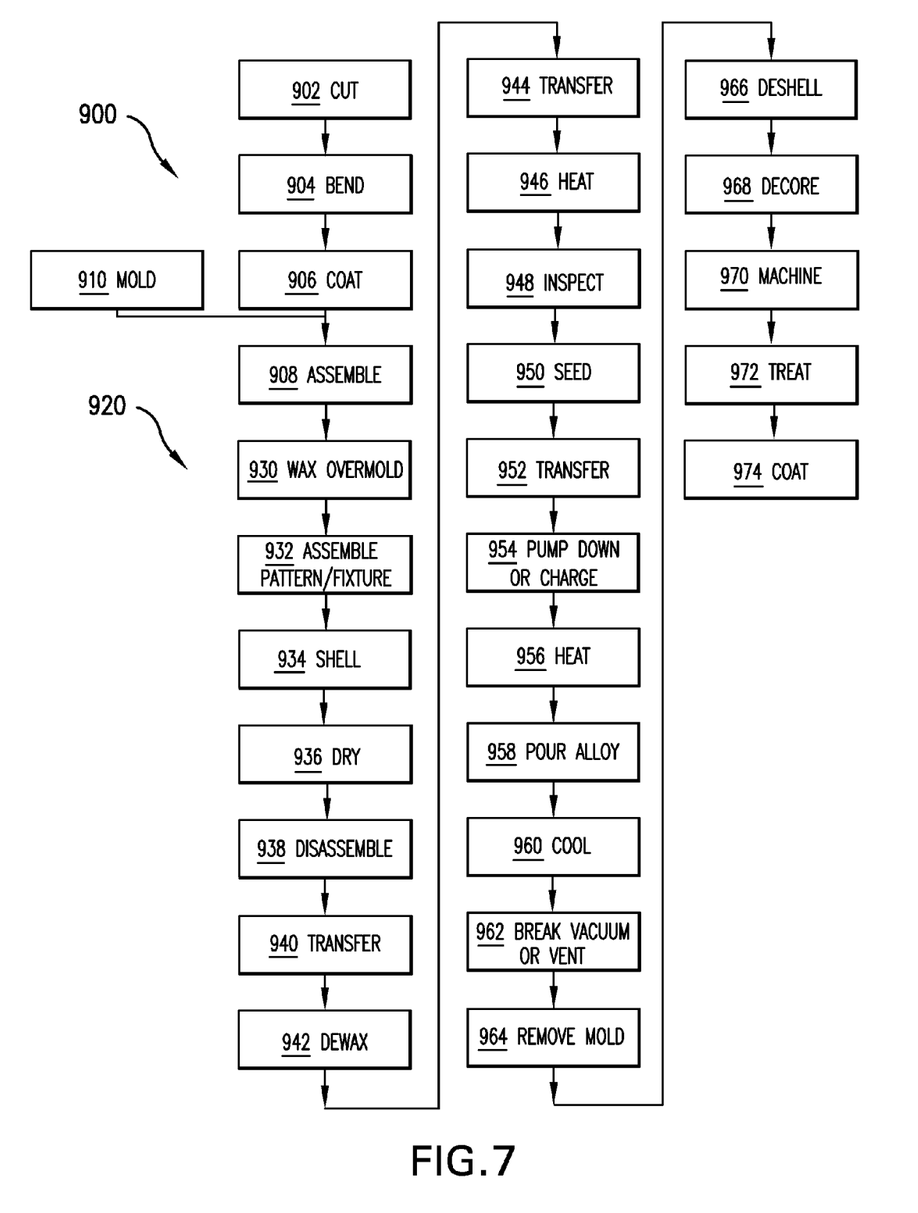
FIG. 7 is a flowchart of a core and casting manufacturing process.

Steps in the manufacture 900 of the core assembly and casting are broadly identified in the flowchart of FIG. 7. In a cutting operation 902 (e.g., laser cutting, electro-discharge machining (EDM), liquid jet machining, or stamping), one or more cuttings are cut from a blank for forming the RMCs. The exemplary blank is of a refractory metal-based sheet stock (e.g., molybdenum or niobium) having a thickness in the vicinity of 0.01-0.10 inch (0.2-2.5 mm) between parallel first and second faces and transverse dimensions much greater than that. Each exemplary cutting has the cut features of the associated RMC including the separations between the trunk portions and any holes (e.g., for forming posts or other features in the metallic core).

In a second step 904, if appropriate, each cutting is bent to form the associated bends as well as any other contouring (e.g., to more slightly bend a portion of the metallic core to more closely follow the associated pressure side or suction side of the airfoil). More complex forming procedures are also possible.

The RMC may be coated 906 with a protective coating. Exemplary coating materials include silica, alumina, zirconia, chromia, mullite and hafnia. Coatings may be applied by any appropriate line-of sight or non-line-of sight technique (e.g., chemical or physical vapor deposition (CVD, PVD) methods, plasma spray methods, electrophoresis, and sol gel methods). Individual layers may typically be 0.1 to 1 mil (2.5-25 micrometer) thick. Layers of Pt, other noble metals, Cr, Si, W, and/or Al, or other non-metallic materials may be applied to the metallic core elements for oxidation protection in combination with a ceramic coating for protection from molten metal erosion and dissolution.

The RMCs may then be mated/assembled 908 to the feedcore. For example, the feedcore may be pre-molded 910 and, optionally, pre-fired. Optionally, a ceramic adhesive or other securing means may be used. An exemplary ceramic adhesive is a colloid which may be dried by a microwave process. Alternatively, the feedcore may be overmolded to the RMCs. For example, the RMCs may be placed in a die and the feedcore (e.g., silica-, zircon-, or alumina-based) molded thereover. An exemplary overmolding is a freeze casting process. Although a conventional molding of a green ceramic followed by a de-bind/fire process may be used, the freeze casting process may have advantages regarding limiting degradation of the RMCs and limiting ceramic core shrinkage.

FIG. 7 also shows an exemplary method 920 for investment casting using the composite core assembly. Other methods are possible, including a variety of prior art methods and yet-developed methods. The core assembly is then overmolded 930 with an easily sacrificed material such as a natural or synthetic wax (e.g., via placing the assembly in a mold and molding the wax around it). There may be multiple such assemblies involved in a given mold.

The overmolded core assembly (or group of assemblies) forms a casting pattern with an exterior shape largely corresponding to the exterior shape of the part to be cast. The pattern may then be assembled 932 to a shelling fixture (e.g., via wax welding between end plates of the fixture). The pattern may then be shelled 934 (e.g., via one or more stages of slurry dipping, slurry spraying, or the like). After the shell is built up, it may be dried 936. The drying provides the shell with at least sufficient strength or other physical integrity properties to permit subsequent processing. For example, the shell containing the invested core assembly may be disassembled 938 fully or partially from the shelling fixture and then transferred 940 to a dewaxer (e.g., a steam autoclave). In the dewaxer, a steam dewax process 942 removes a major portion of the wax leaving the core assembly secured within the shell. The shell and core assembly will largely form the ultimate mold. However, the dewax process typically leaves a wax or byproduct hydrocarbon residue on the shell interior and core assembly.

After the dewax, the shell is transferred 944 to a furnace (e.g., containing air or other oxidizing atmosphere) in which it is heated 946 to strengthen the shell and remove any remaining wax residue (e.g., by vaporization) and/or converting hydrocarbon residue to carbon. Oxygen in the atmosphere reacts with the carbon to form carbon dioxide. Removal of the carbon is advantageous to reduce or eliminate the formation of detrimental carbides in the metal casting. Removing carbon offers the additional advantage of reducing the potential for clogging the vacuum pumps used in subsequent stages of operation.

The mold may be removed from the atmospheric furnace, allowed to cool, and inspected 948. The mold may be seeded 950 by placing a metallic seed in the mold to establish the ultimate crystal structure of a directionally solidified (DS) casting or a single-crystal (SX) casting. Nevertheless the present teachings may be applied to other DS and SX casting techniques (e.g., wherein the shell geometry defines a grain selector) or to casting of other microstructures. The mold may be transferred 952 to a casting furnace (e.g., placed atop a chill plate in the furnace). The casting furnace may be pumped down to vacuum 954 or charged with a non-oxidizing atmosphere (e.g., inert gas) to prevent oxidation of the casting alloy. The casting furnace is heated 956 to preheat the mold. This preheating serves two purposes: to further harden and strengthen the shell; and to preheat the shell for the introduction of molten alloy to prevent thermal shock and premature solidification of the alloy.

After preheating and while still under vacuum conditions, the molten alloy is poured 958 into the mold and the mold is allowed to cool to solidify 960 the alloy (e.g., after withdrawal from the furnace hot zone). After solidification, the vacuum may be broken 962 and the chilled mold removed 964 from the casting furnace. The shell may be removed in a deshelling process 966 (e.g., mechanical breaking of the shell).

The core assembly is removed in a decoring process 968 to leave a cast article (e.g., a metallic precursor of the ultimate part). The cast article may be machined 970, chemically and/or thermally treated 972 and coated 974 to form the ultimate part. Some or all of any machining or chemical or thermal treatment may be performed before the decoring.

Figure 8:
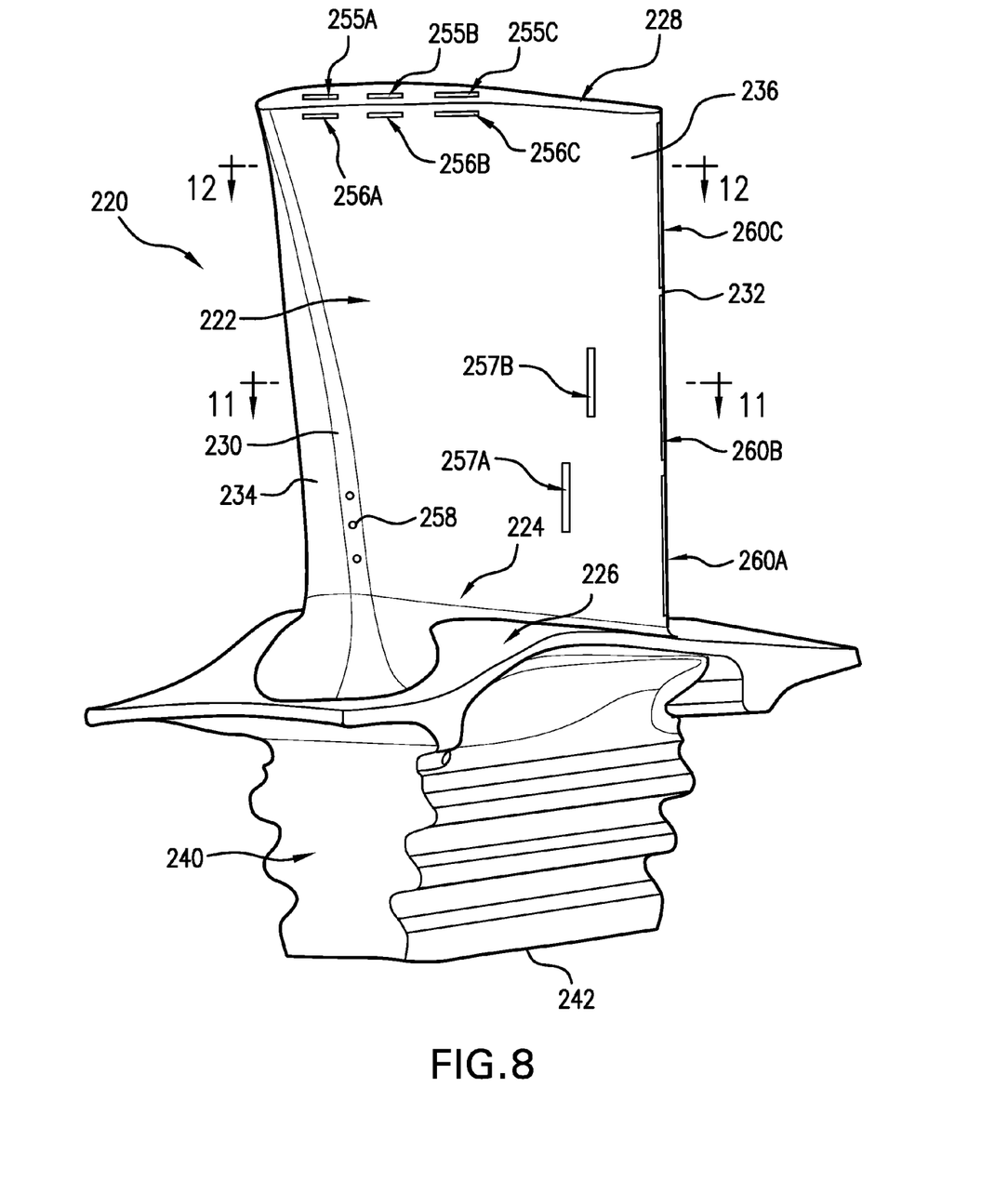
FIG. 8 is a view of a cast blade.

As an alternate embodiment, FIG. 8 shows a gas turbine engine blade 220. The blade 220 has an airfoil 222 extending from an inboard end 224 at the outboard surface of a platform 226 to an outboard end or tip 228. The airfoil has a leading edge 230 and a trailing edge 232. The airfoil has a suction side/surface 234 and a pressure side/surface 236 extending between the leading edge 230 and the trailing edge 232. A convoluted attachment root (a so-called "fir-tree" root) 240 depends from an underside (or inboard surface) of the platform 226 and has an inboard (inner diameter or ID) end/surface 242.

The exemplary blade 220 is cast from an alloy (e.g., a nickel-based superalloy) and has an internal cooling passageway system. The exemplary cooling passageway system has a plurality of inlets. The exemplary inlets are along the root 240, more particularly along the inboard end/surface 242. The exemplary blade has inlets 250A, 250B1-250B4, 250C1-250C3, 252A-252C, and 254A-254C (FIG. 9), discussed further below.

The exemplary cooling passageway system has a plurality of outlets. The exemplary outlets are along the airfoil 222. The exemplary outlets include outlets 255A-256C (FIG. 8) along the tip and outlets along the airfoil perimeter. Exemplary outlets along the airfoil perimeter include: outlets 256A-256C along the pressure side 236 near the tip 228; outlets 257A and 257B along the pressure side 236 near the platform 226 (e.g., in a trailing inboard quadrant of the pressure side 236); leading edge outlets 258, and trailing edge outlets 260A-260C (FIG. 8). Exemplary leading edge outlets are drilled holes. The exemplary trailing edge outlets 260A-

Figure 10:
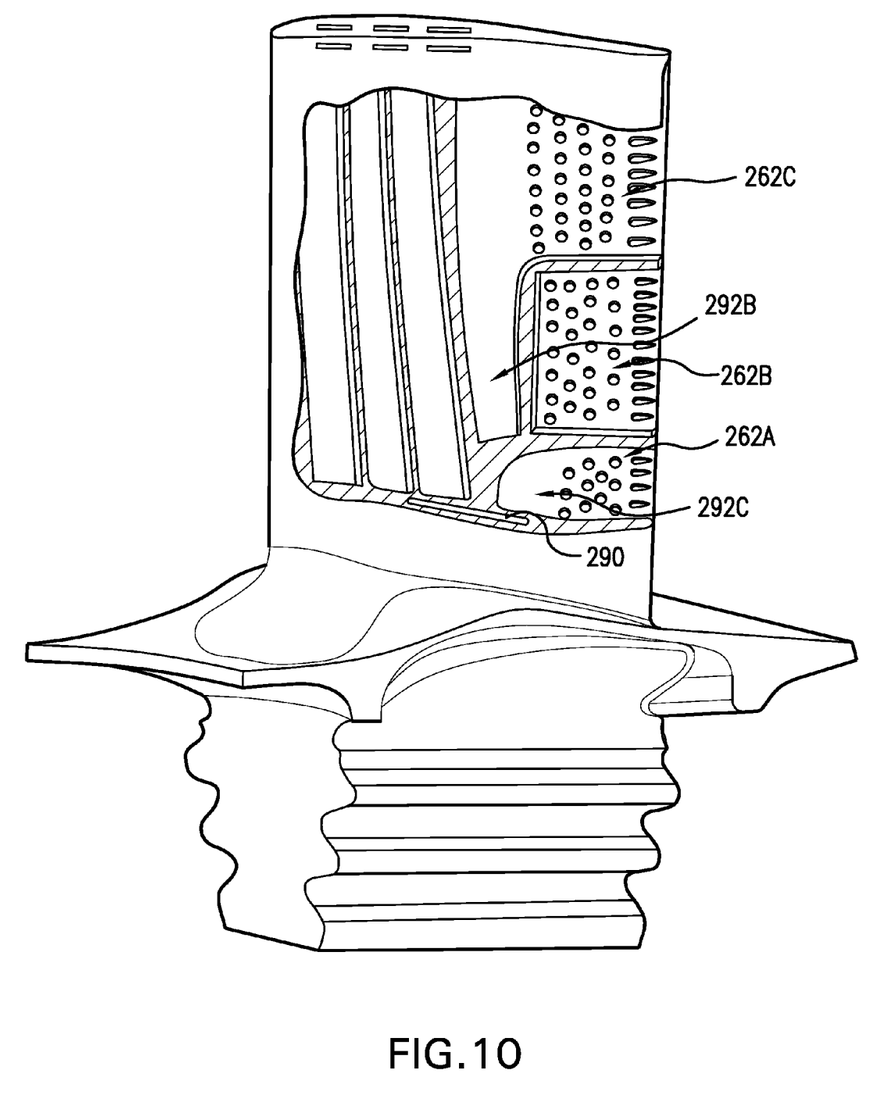
FIG. 10 is a cutaway view of the blade of FIG. 8.

260C are formed by a trailing edge discharge slot having segments 262A-262C (FIG. 10).

Figure 9:
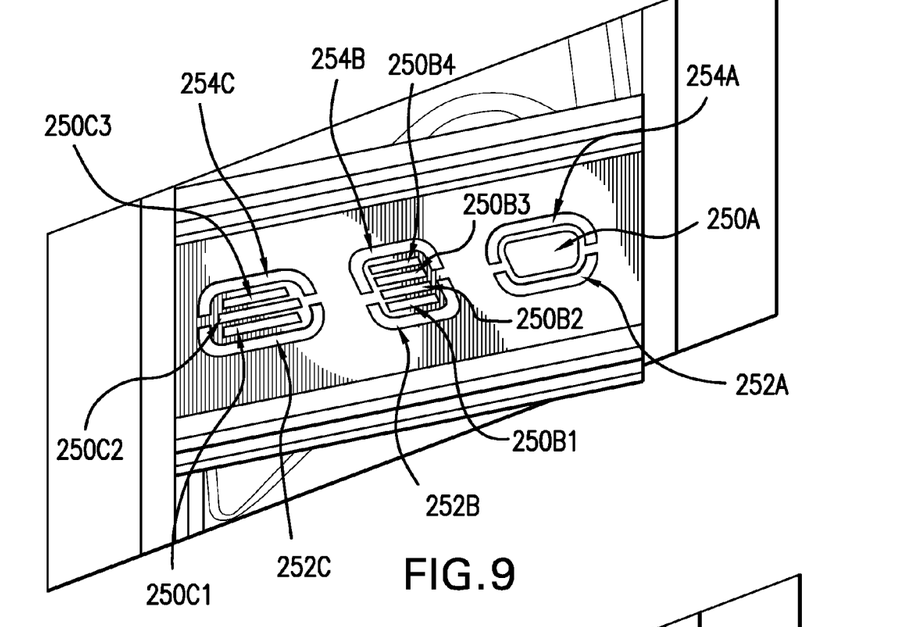
FIG. 9 is a root ID view of the blade of FIG. 8.
Figure 11:
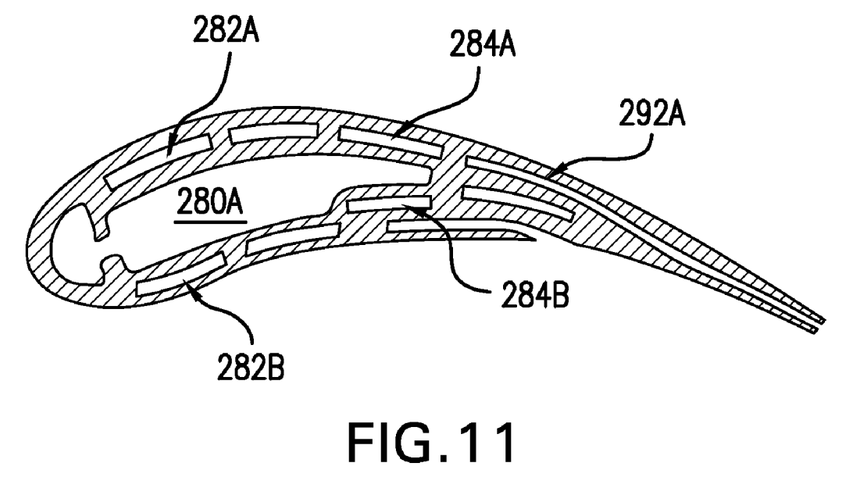
FIG. 11 is a sectional view of an airfoil of the blade of FIG. 8, taken along line 11-11.
Figure 12:
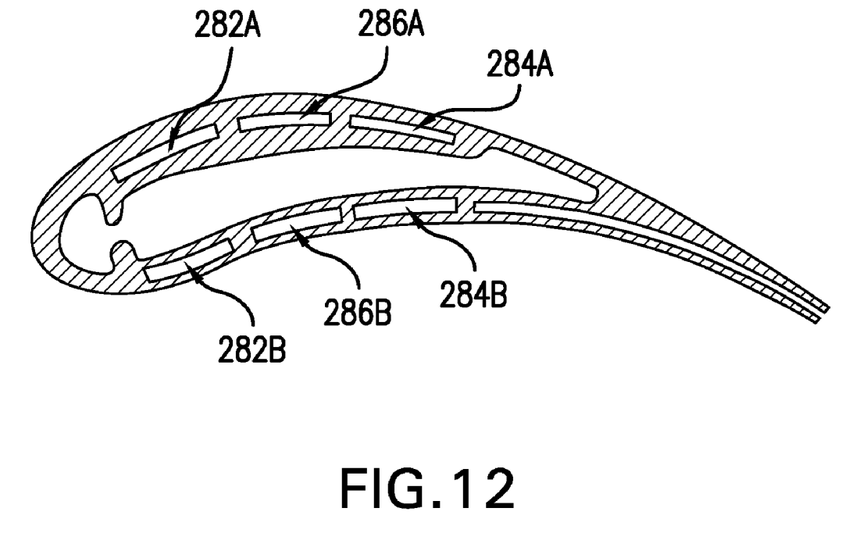
FIG. 12 is a sectional view of the airfoil of the blade of FIG. 8, taken along line 12-12.

The exemplary inlets 250A-250C, 252A-252C, and 254A-254C of FIG. 9 each feed a respective passageway trunk extending radially outward within the root. The exemplary inlet 250A feeds a passageway 280A (FIG. 11) which includes a main portion and a leading edge impingement cavity portion. The exemplary passageway 280A generally spans a median of the airfoil cross-section centrally between the pressure side and suction side. The exemplary inlets 252A, 252B, and 252c feed respective trunks which merge in the platform to feed a spanwise passageway 282A extending to the outlet 255A. The exemplary inlet 254A feeds passageway 282B which extends to the outlet 256A. The inlets 250B1 and 250B4 respectively feed passageways 284A and 284B extending to the outlets 255C and 256C, respectively. Similarly, the inlets 250B2 and 250B3 respectively feed passageways 286A and 286B extending to the outlets 255B and 256B.

The inlet 254B and 254C feed respective trunks of a common passageway 290 (FIG. 10) which, in turn, bifurcates again to feed the respective outlets 257A and 257B.

The inlet 250C1 feeds a passageway 292A (FIG. 11) of which the segment 262B is an outlet/terminal/downstream portion. Similarly, the inlet 252C2 feeds a passageway 292B (FIG. 10) of which the segment 262C is the outlet/terminal/downstream portion. Similarly, the inlet 250C3 feeds a passageway 292C of which the segment 262A is the outlet/terminal/downstream portion. In similar fashion to that discussed above for the vane 20, it is seen that the segments 262A, 262B, and 262C are separately and differently fed via passageways/offset/staggered from each other between pressure and suction sides and normal to the median over at least portions of the extent of those passageways. Similar bends may be provided in the passageways to transition from that stagger to the more aligned condition along the trailing edge.

Figure 13:
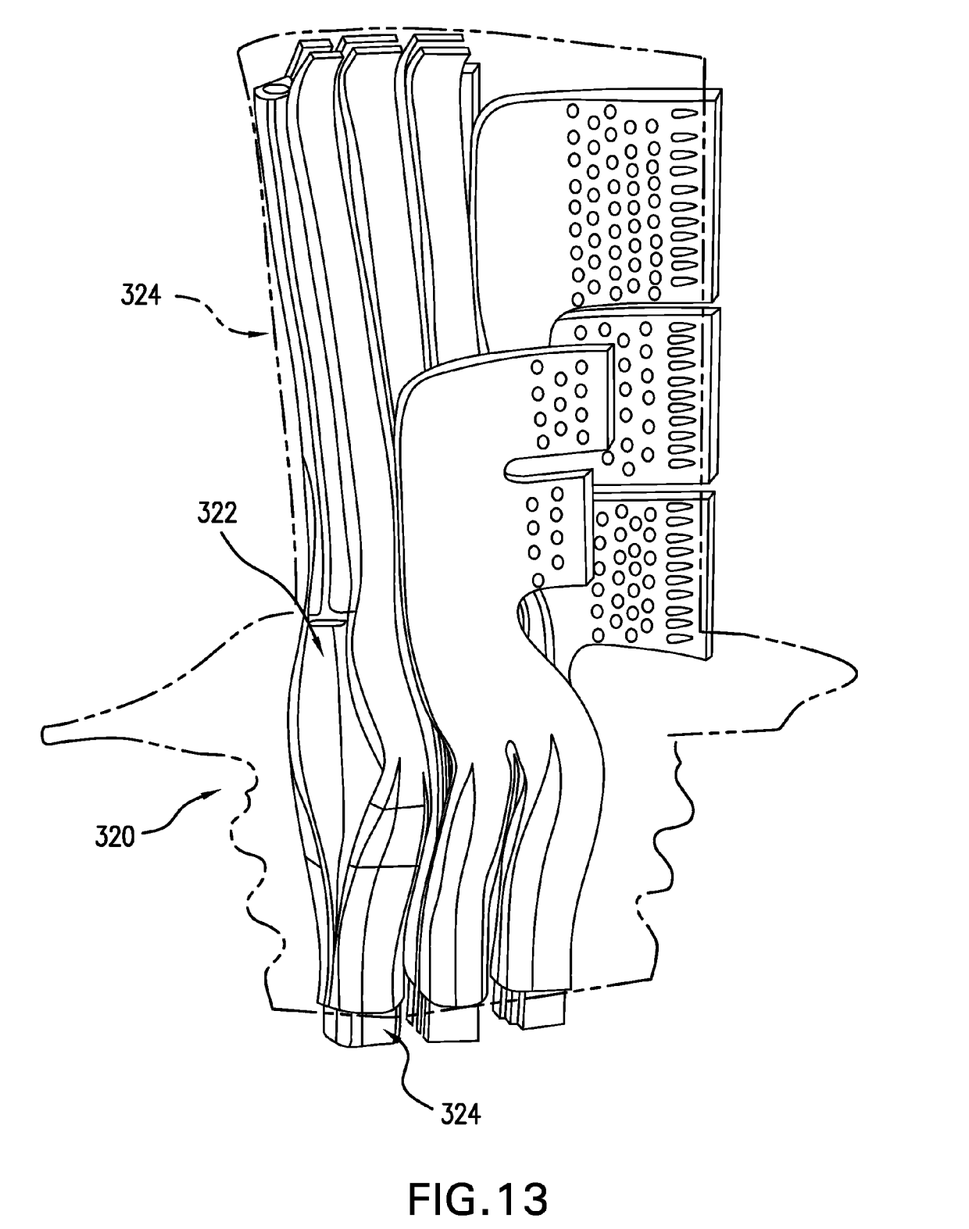
FIG. 13 is a view of a pattern for forming the blade of FIG. 8.
Figure 14:
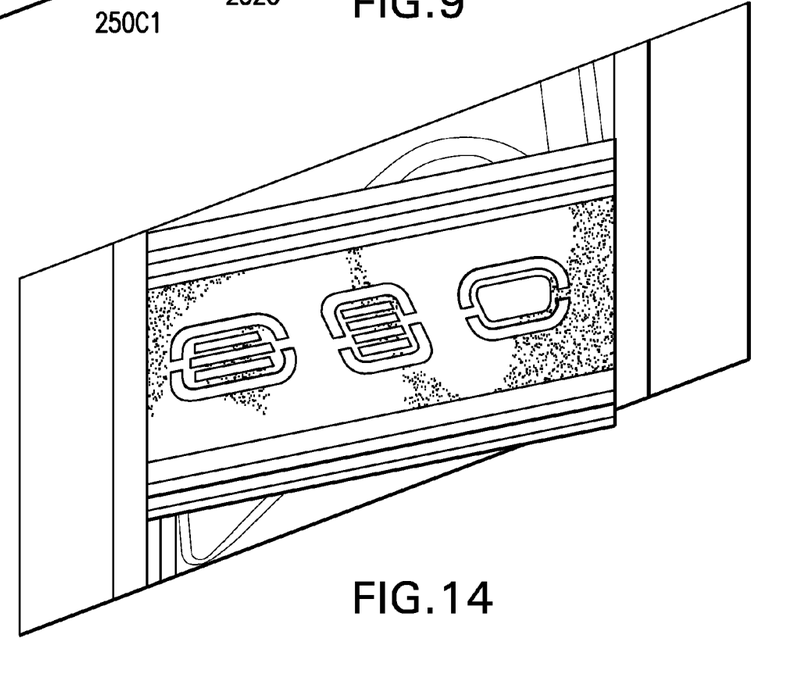
FIG. 14 is a root ID view of the pattern of FIG. 13.

FIGS. 13 and 14 show a pattern 320 for casting the blade 220. The relationship of the pattern 320 to the blade 220 is the same as the relationship of the pattern 140 to the vane 20. Additionally, the relationship is similar to that of blades and their patterns shown in copending application Ser. No. 12/275,777 entitled CASTINGS, CASTING CORES, AND METHODS and filed on even date herewith, the disclosure of which is incorporated by reference herein in its entirety as if set forth at length. Accordingly, this relationship and the details of the pattern are not separately discussed in such detail. However, the pattern includes a core assembly 322 and a sacrificial pattern material 324 (e.g., wax) molded thereover. The core assembly 322 includes a ceramic core 324 which forms the passageway 280A. The core assembly 322 further includes refractory metal cores for casting the remaining passageways.

Figure 15:
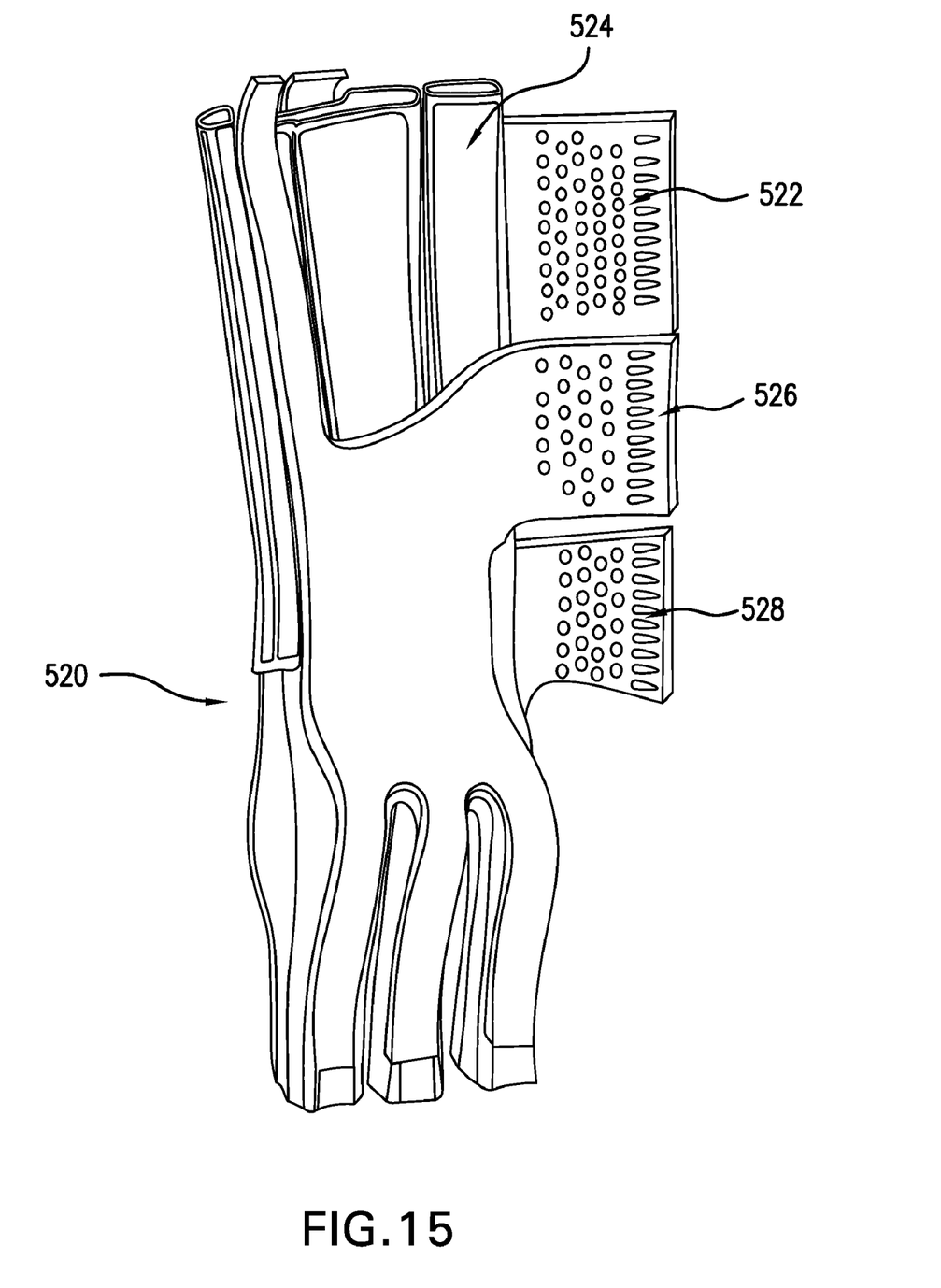
FIG. 15 is a view of a core assembly for forming a second blade.

FIG. 15 shows an alternative core assembly 520 for forming a blade having another segmented trailing edge slot. An outboard segment of the slot is cast by an RMC 522 embedded in a trailing leg 524 of a ceramic feedcore. An intermediate segment of the slot is cast by a corresponding portion of a pressure side RMC 526. An inboard segment is cast by a corresponding portion of a suction side RMC 528. The suction side RMC and pressure side RMC trifurcate to each form an exemplary three inlet trunks in the associated blade root adjacent respective trunks of the ceramic core.

Figure 16:
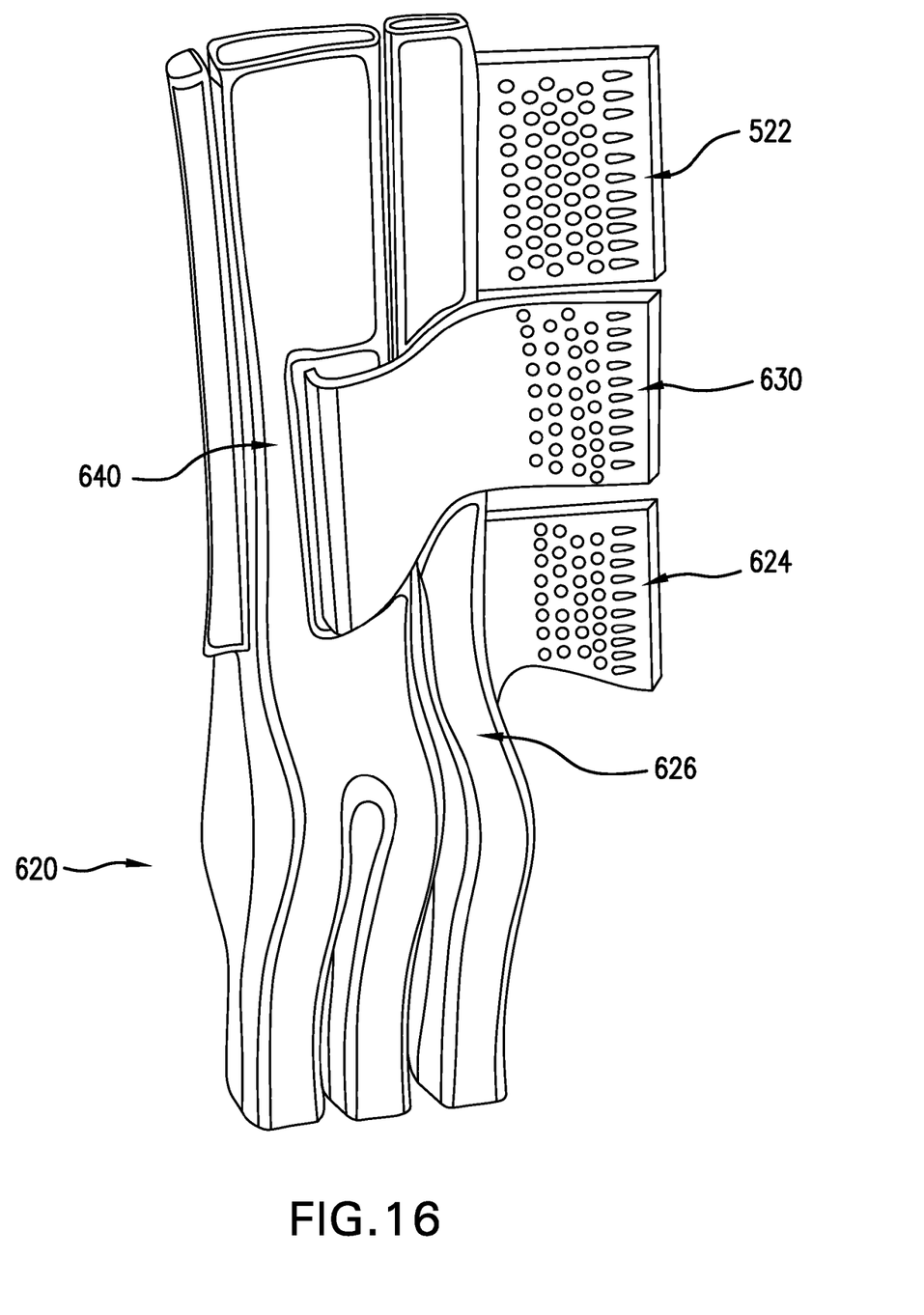
FIG. 16 is a view of a core assembly for forming a third blade.

FIG. 16 shows a core assembly 620 for forming yet another blade. In the exemplary assembly, an outboard segment and an inboard segment of the trailing edge slot are respectively formed by RMCs 622 and 624 having leading portions embedded/mounted in a slot in a trailing ceramic feedcore 626 to secure the RMCs to the feedcore. An intermediate segment is cast by a corresponding portion of an RMC 630 extending to the pressure side of the feedcore 626 and having a leading portion embedded in a slot in a leading feedcore 640. An upstream portion of the resulting passageway feeding the intermediate segment thus extends to the suction side of the trailing edge feed passageway cast by the core 626 to provide the offset/stagger such as described above.

One or more embodiments have been described. Nevertheless, it will be understood that various modifications may be made. For example, the principles may be implemented using modifications of various existing or yet-developed processes, apparatus, or resulting cast article structures (e.g., in a reengineering of a baseline cast article to modify cooling passageway configuration). In any such implementation, details of the baseline process, apparatus, or article may influence details of the particular implementation. Accordingly, other embodiments are within the scope of the following claims.

What is claimed is:

1. A pattern for casting a component having an airfoil, the pattern comprising:
   a pattern material having an airfoil portion having: a leading edge; a trailing edge; a pressure side; and a suction side; and
   a casting core combination at least partially embedded in the pattern material and comprising:
      a plurality of metallic casting cores each having:
         opposite first and second faces; and
         a respective portion along the trailing edge,
   wherein:
      at least two of the metallic casting cores extend partially outside the airfoil within the pattern material and have sections offset between the pressure side and suction side.

2. The pattern of claim 1 wherein:
   said respective portions of at least three of the metallic casting cores are spanwise offset.

3. The pattern of claim 1 wherein the casting core combination further comprises:
   at least one ceramic casting core.

4. The pattern of claim 3 wherein:
   a portion of a first said metallic casting core is to the suction side of a portion of the at least one ceramic casting core; and
   a portion of a second said metallic casting core is to the pressure side of a portion of the at least one ceramic casting core.

5. The pattern of claim 3 wherein:
   the at least one ceramic casting core comprises at least one ceramic feedcore; and
   a trunk of said ceramic feedcore is adjacent at least one of the metallic casting cores.

6. The pattern of claim 1 wherein:
   the component is a vane;
   the pattern material has an OD shroud portion; and
   said at least two of the metallic casting cores protrude from the pattern material along the OD shroud portion.

7. The pattern of claim 1 wherein:
   the first and second faces are parallel.

8. The pattern of claim 7 wherein:
   a thickness between said first and second faces is 0.2-2.5 mm over a majority of an area of the metallic casting core.

9. A method for forming the pattern of claim 1 comprising:
   forming the metallic casting cores form sheetstock;
   molding at least one additional core of a ceramic; and
   assembling the metallic casting cores to the at least one additional core.

10. The method of claim 9 wherein the forming the metallic casting core comprises:
cutting a perimeter and a plurality of internal apertures; and
after the cutting, bending.

11. The method of claim 9 further comprising:
molding the pattern material at least partially over the casting core combination for forming the pattern.

12. A method for casting comprising:
forming, according to claim 11, the pattern;
shelling the pattern;
removing the pattern material from the shelled pattern for forming a shell;
introducing molten alloy to the shell; and
removing the shell and casting core combination.

13. The method of claim 11 used to form a gas turbine engine component.

14. A gas turbine engine component comprising:
an airfoil having:
a leading edge;
a trailing edge;
a pressure side extending between the leading edge and trailing edge;
a suction side extending between the leading edge and trailing edge; and
a cooling passageway system extending through the airfoil and comprising:
a plurality of inlets; and
a segmented trailing edge discharge slot,
wherein:
the cooling passageway system comprises a plurality of sections stacked between the pressure side and suction side and respectively feeding different ones of the segments of the trailing edge discharge slot.

15. The component of claim 14 wherein:
the cooling passageway system comprises a plurality of trunks stacked streamwise; and
a trailing said trunk has a plurality of stacked portions respectively formed by associated ones of the stacked sections.

16. The component of claim 14 wherein:
the cooling passageway system comprises a plurality of trunks stacked streamwise; and
each of at least two said trunks has a plurality of stacked portions respectively formed by associated ones of the stacked sections.

17. The component of claim 16 wherein:
said at least two sections each comprise at least three said stacked portions, two of which feed different ones of the segments and at least one of which does not.

18. The component of claim 14 wherein:
the component is a vane and the inlets are in an OD face of an OD shroud.

19. The component of claim 14 wherein:
there are at least three said segments.

20. A pattern for casting a component having an airfoil, the pattern comprising:
a pattern material having an airfoil portion having: a leading edge; a trailing edge; a pressure side; and a suction side; and
a casting core combination at least partially embedded in the pattern material and comprising:
a plurality of metallic casting cores each having:
opposite first and second faces; and
trunk portions in the pattern material at least partially outside of the airfoil portion where one said face of a first said metallic casting core faces another core.

21. The pattern of claim 20 wherein:
said another core is a second said metallic casting core and said face of said first metallic casting core faces a face of said second metallic casting core.

22. The pattern of claim 20 wherein:
said another core is a ceramic feedcore.

23. A gas turbine engine component comprising:
an airfoil having:
a leading edge;
a trailing edge;
a pressure side extending between the leading edge and trailing edge;
a suction side extending between the leading edge and trailing edge; and
a cooling passageway system extending through the airfoil and comprising:
a plurality of inlets; and
a plurality of outlets,
wherein:
the cooling passageway system comprises:
a plurality of sections stacked between the pressure side and suction side;
a plurality of trunks arrayed streamwise; and
at least one said trunk having a plurality of stacked portions respectively formed by associated ones of the stacked sections in the pattern material at least partially outside of the airfoil portion.

* * * * *